US006722634B1

(12) United States Patent
Hsu

(10) Patent No.: US 6,722,634 B1
(45) Date of Patent: Apr. 20, 2004

(54) JOINT BETWEEN A FIRST CYLINDER AND A SECOND CYLINDER OF A HYDRAULIC JACK TO ALLOW THE SECOND CYLINDER TO DRIVE THE ARM DIRECTLY

(76) Inventor: Kun-Shan Hsu, No. 16, Lane 175, Hai Kuo Liao Rd., Pei Hu Li, Chiayi City (TW)

(*) Notice: Subject to any disclaimer, the term of this patent is extended or adjusted under 35 U.S.C. 154(b) by 12 days.

(21) Appl. No.: 10/263,750

(22) Filed: Oct. 4, 2002

(51) Int. Cl.[7] .................................................. B60P 1/60

(52) U.S. Cl. ....................... 254/8 B; 254/8 R; 254/2 R; 254/93 H; 254/89 H

(58) Field of Search ................................ 254/8 B, 2 B, 254/8 R, 2 R, 9 B, 93 R, 93 H, 89 H, DIG. 1, DIG. 16, DIG. 3

(56) References Cited

U.S. PATENT DOCUMENTS

| | | | | |
|---|---|---|---|---|
| 6,505,816 B1 | * | 1/2003 | Hung | 254/8 B |
| 6,581,909 B2 | * | 6/2003 | Wixey | 254/8 B |
| 2001/0050359 A1 | * | 12/2001 | Tominaga et al. | 254/8 B |

* cited by examiner

*Primary Examiner*—Lee D. Wilson
(74) *Attorney, Agent, or Firm*—Rosenberg, Klein & Lee

(57) ABSTRACT

A hydraulic jack includes a first cylinder, a handle pivotally connected to the first cylinder to activate the first cylinder, a second cylinder in communication with the first cylinder and having a piston received in the second cylinder to connect to an arm so as to support a seat on top of the arm. A pivotal shaft is provided at a joint between the first cylinder and the second cylinder so that the first cylinder is pivotally connected to the second cylinder by way of the pivotal shaft.

9 Claims, 9 Drawing Sheets

JOINT BETWEEN A FIRST CYLINDER AND A SECOND CYLINDER OF A HYDRAULIC JACK TO ALLOW THE SECOND CYLINDER TO DRIVE THE ARM DIRECTLY

BACKGROUND OF THE INVENTION

1. Field of the Invention

The present invention relates to a hydraulic jack, and more particularly to a joint between a first cylinder and a second cylinder of a hydraulic jack to allow the second cylinder to drive the arm directly.

2. Description of Related Art

A conventional hydraulic jack is shown in FIG. 9, which has a body (30) with multiple rollers (31) rotatably mounted on a bottom of the body (30) to allow the jack to be moved, a cylinder (40) mounted in the body (30) and having a piston rod (43) extendable out of the cylinder (40), a push arm (35) pivotally connected to a free end of the piston rod (43), an arm (32) pivotally connected to a free end of the push arm (35) and having two auxiliary arms (33) oppositely mounted on each side of the arm (32) and a seat (34) mounted on top of the arm (32).

When this conventional hydraulic jack is in application, the piston rod (43) moves in a direction as shown by the arrow, which lifts the arm (32) as well as the two auxiliary arms (33) so that if there is a load on top of the seat (34), the upward movement of the arm (32) will lift the load on top of the seat (34).

However, with careful review of the design of the conventional hydraulic jack, it is noted that when the cylinder (40) is activated, the cylinder (40) applies a horizontal drive to the push arm (35) so as to lift the arm (32). Furthermore, the two auxiliary arms (33) on opposite sides of the arm (32) as well as the push arm (35) take up a great deal of space in the body (30). Therefore, the conventional hydraulic jack is excessively bulky which hinders its practicability.

Furthermore, because the piston rod (43) indirectly drives the arm (32), a great force is required to drive the arm (32).

Further still, because there are multiple joints in the jack, smooth operation of the hydraulic jack is not easy to be sustained.

To overcome the shortcomings, the present invention tends to provide an improved joint between cylinders of a hydraulic jack to mitigate and obviate the aforementioned problems.

SUMMARY OF THE INVENTION

The primary objective of the present invention is to provide an improved joint between a first cylinder and a second cylinder of a hydraulic jack so that when pumping the first cylinder, the hydraulic fluid in the first cylinder is able to drive the second cylinder directly.

Another objective of the present invention is that the joint between the second cylinder and the arm is pivotal so that when the second cylinder is activated by the first cylinder, the arm is able to be lifted horizontally relative to the body of the hydraulic jack.

Still another objective of the present invention is to provide a first annular fluid passage and a second fluid passage in the pivotal shaft that is used to connect the first cylinder and the second cylinder so that whenever the pivotal shaft is rotated, hydraulic fluid is able to flow into the second cylinder to lift the arm.

Other objects, advantages and novel features of the invention will become more apparent from the following detailed description when taken in conjunction with the accompanying drawings.

DETAILED DESCRIPTION OF THE PREFERRED EMBODIMENT

Figure 1:
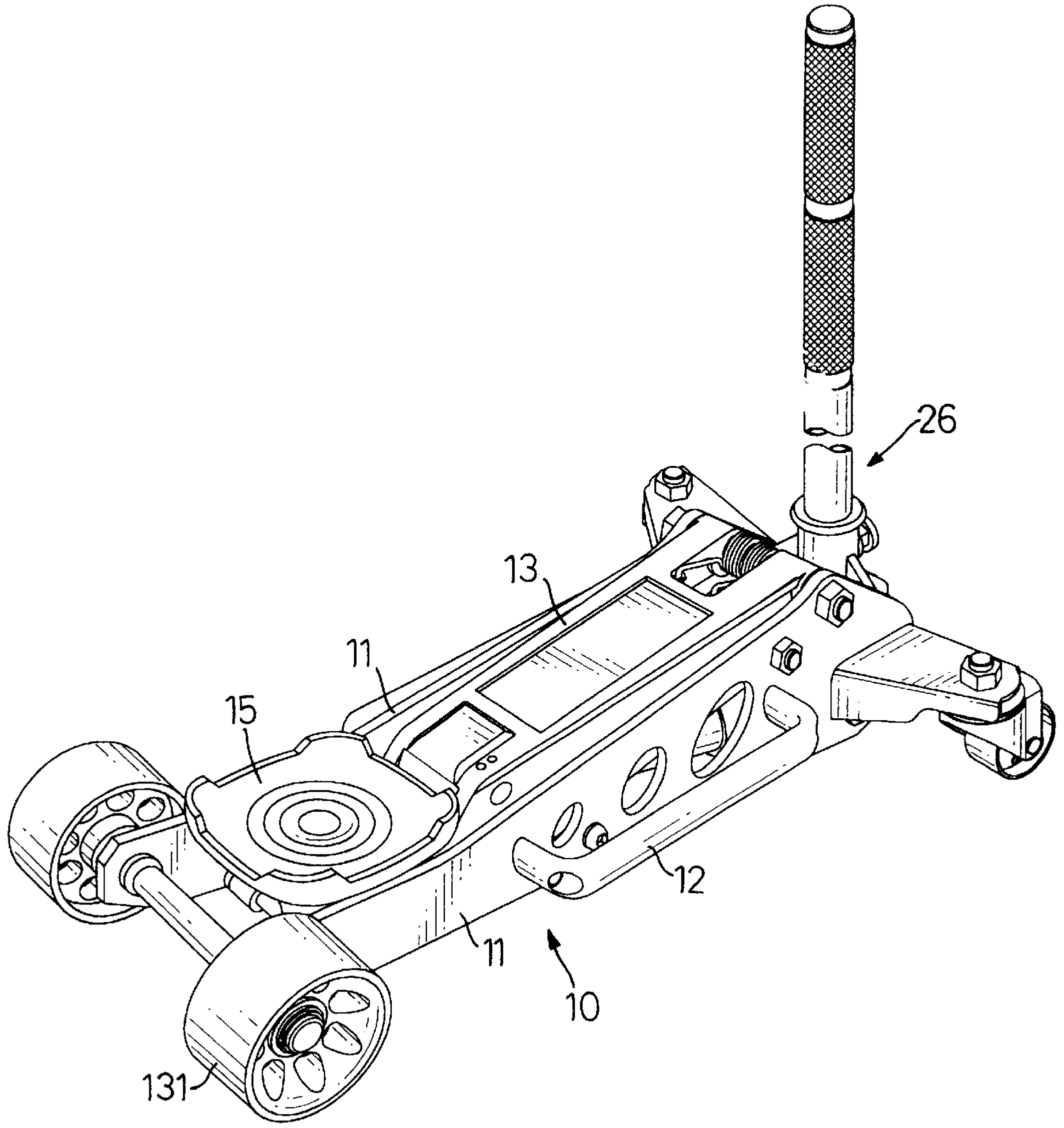
FIG. 1 is a perspective view of the hydraulic jack of the present invention.
Figure 2:
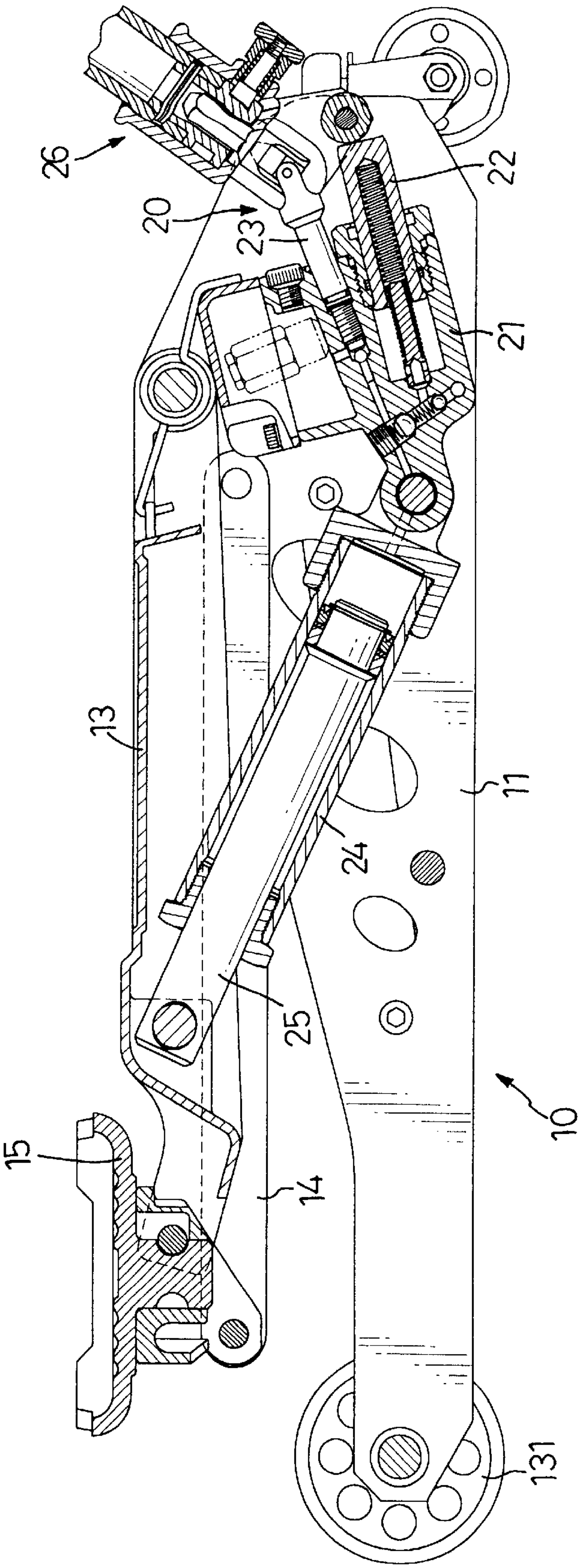
FIG. 2 is a schematic view in partial section showing the internal structure of the hydraulic jack of the present invention.
Figure 3:
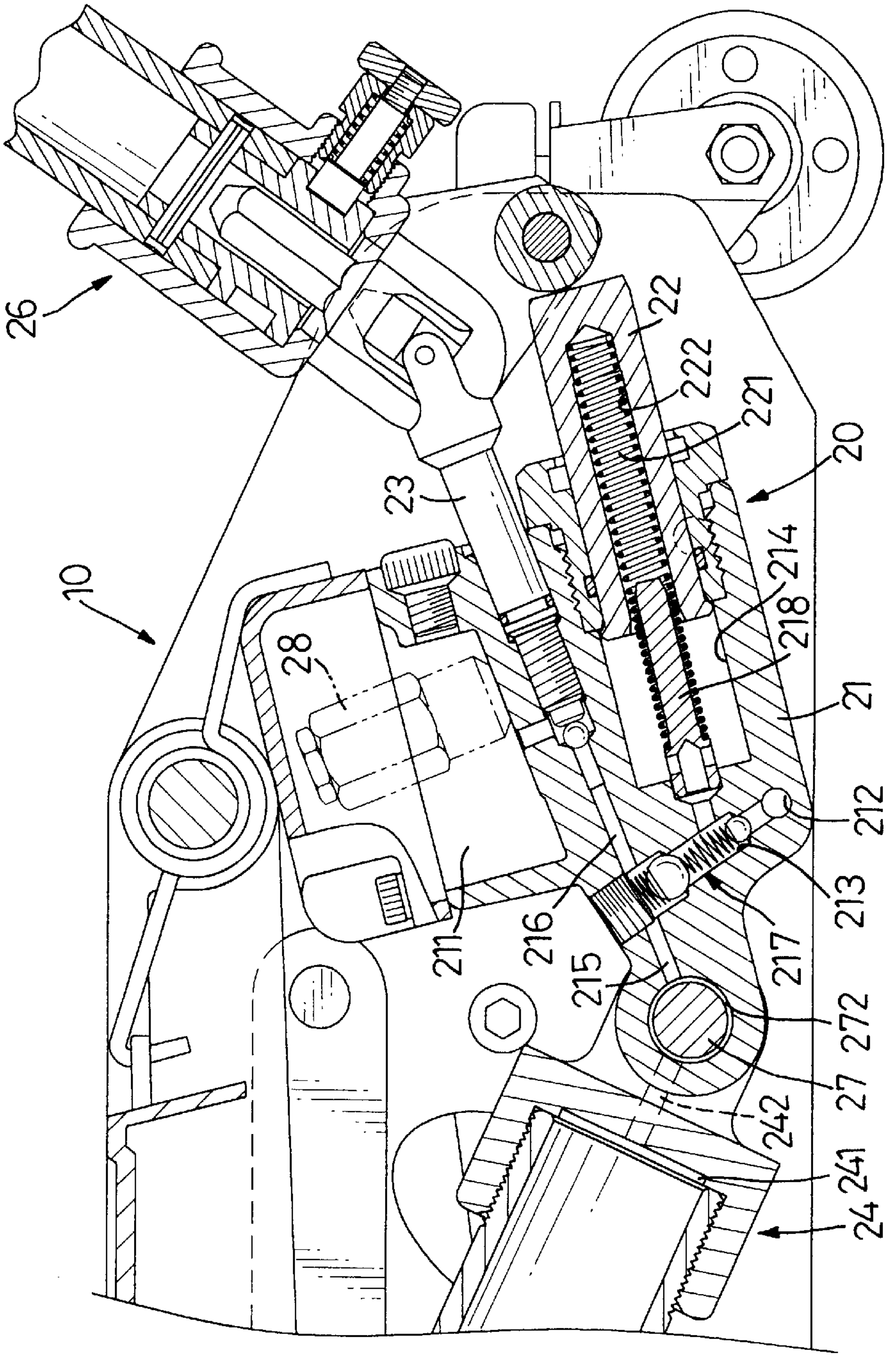
FIG. 3 is an enlarged schematic view showing the internal structure of the first cylinder relative to the second cylinder.

With reference to FIGS. 1, 2 and 3, a hydraulic jack constructed in accordance with the present invention has a body (10) consisting of two side plates (11) each provided with a holder (12) so that a user is able to hold the holder to move the body (10) of the jack, a first cylinder (20) and a second cylinder (24).

The body (10) further has an arm (13) pivotally connected to a distal end of the second cylinder (24), rollers (131) rotatably mounted on a bottom of the body (10), two auxiliary arms (14) respective mounted on opposite sides of the arm (13) to support a seat (15). A handle (26) is pivotally connected to one side of the first cylinder (20) so as to activate the operation of the first cylinder (20).

The first cylinder (20) has a first body (21) with a drive fluid path (214) to receive therein a first piston (22) which is provided with a guide rod (218) received in a slot (222) in the drive shaft (22) and a resilient member (221) mounted around the guide rod (218). A pressure release rod (23) is also connected to a distal end of the handle (26) so that the pressure release rod (23) is able to control the opening of a release path (216). The first body (21) further has a reservoir (211) to receive therein hydraulic fluid and an inlet (212) communicating with the reservoir (211). The release path (216) communicates with the reservoir (211). A control path (213) communicates with both the inlet (212) and the drive fluid path (214) and is defined to receive therein a unidirectional valve (217). On an upper portion of one side of the control path (213), a transmission path (215) communicating with the second cylinder (24) is formed and the release path (216) is provided on the other side of the control path (213). Due to the structure of the unidirectional valve (217) being conventional in the art and the function thereof being well known to a skilled person in the hydraulic jack field, detailed description about how the unidirectional valve (217) works is omitted.

A pivotal shaft (27) is provided at a joint between the first cylinder (20) and the second cylinder (24) and an extension path (242) is provided between the reservoir (211) and the pivotal shaft (27). An adjusting valve (28) (shown in dashed lines) may be provided to adjust the pressure of the hydraulic fluid in the hydraulic jack of the present invention.

Figure 4:
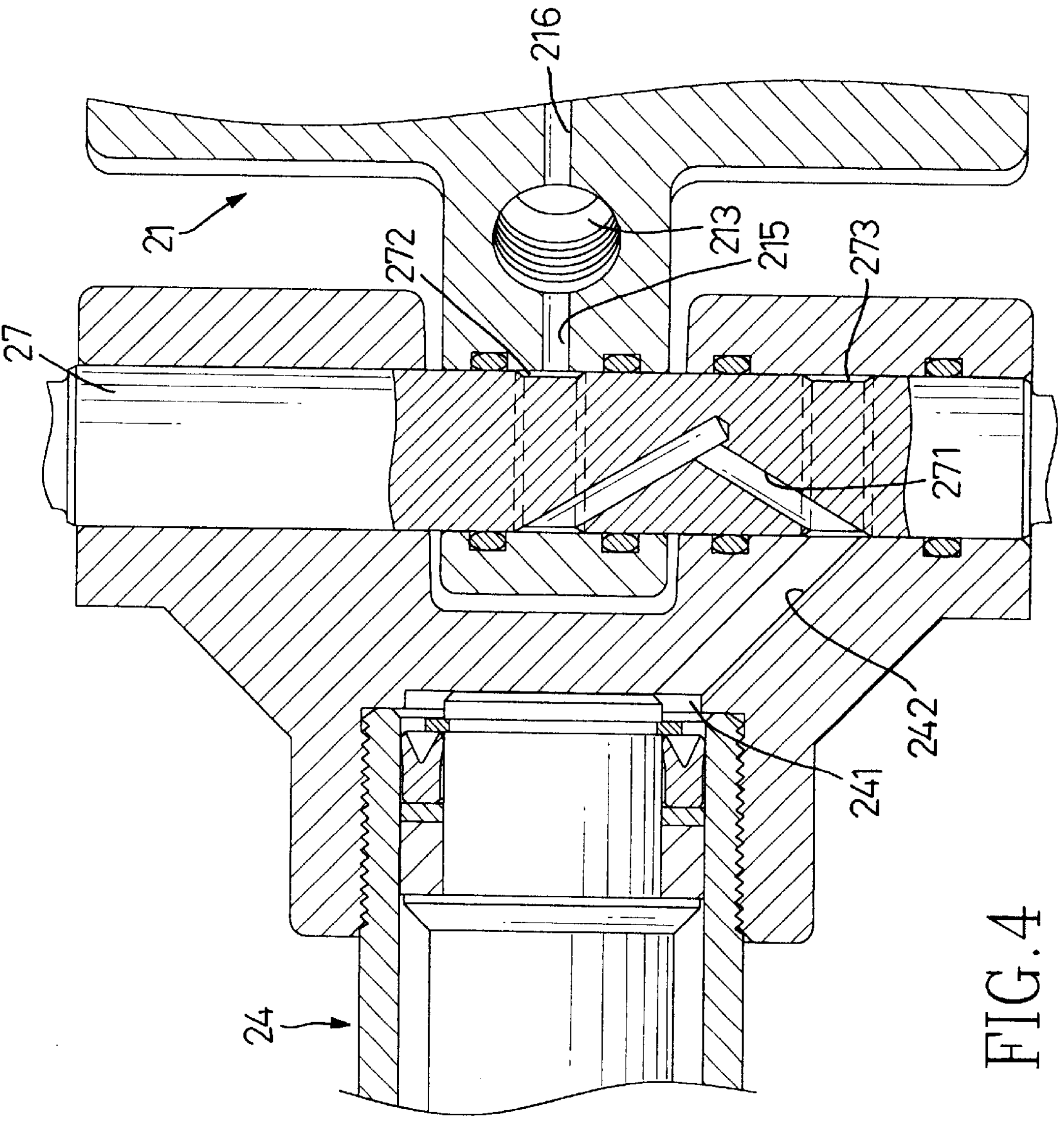
FIG. 4 is a schematic cross sectional view showing the structure of the pivotal shaft in relation to the fluid passage in the first cylinder and the second cylinder.

With reference to FIG. 4, the pivotal shaft (27) has a guide path (271) defined inside the pivotal shaft (27), a first annular fluid passage (272) defined to communicate with one end of the guide path (271) and the transmission path (215) and a second annular fluid passage (273) defined to communicate with the other end of the guide path (271) and the extension path (242). According to the aforementioned communication relationships, hydraulic fluid is able to flow back and forth between the first cylinder (20) and the second cylinder (24).

The second cylinder (24) has a piston chamber (241) defined to receive therein a second piston (25). The second piston (25) together with the two auxiliary arms (14) pivotally connects to the arm (13) and supports the seat (15).

Figure 5:
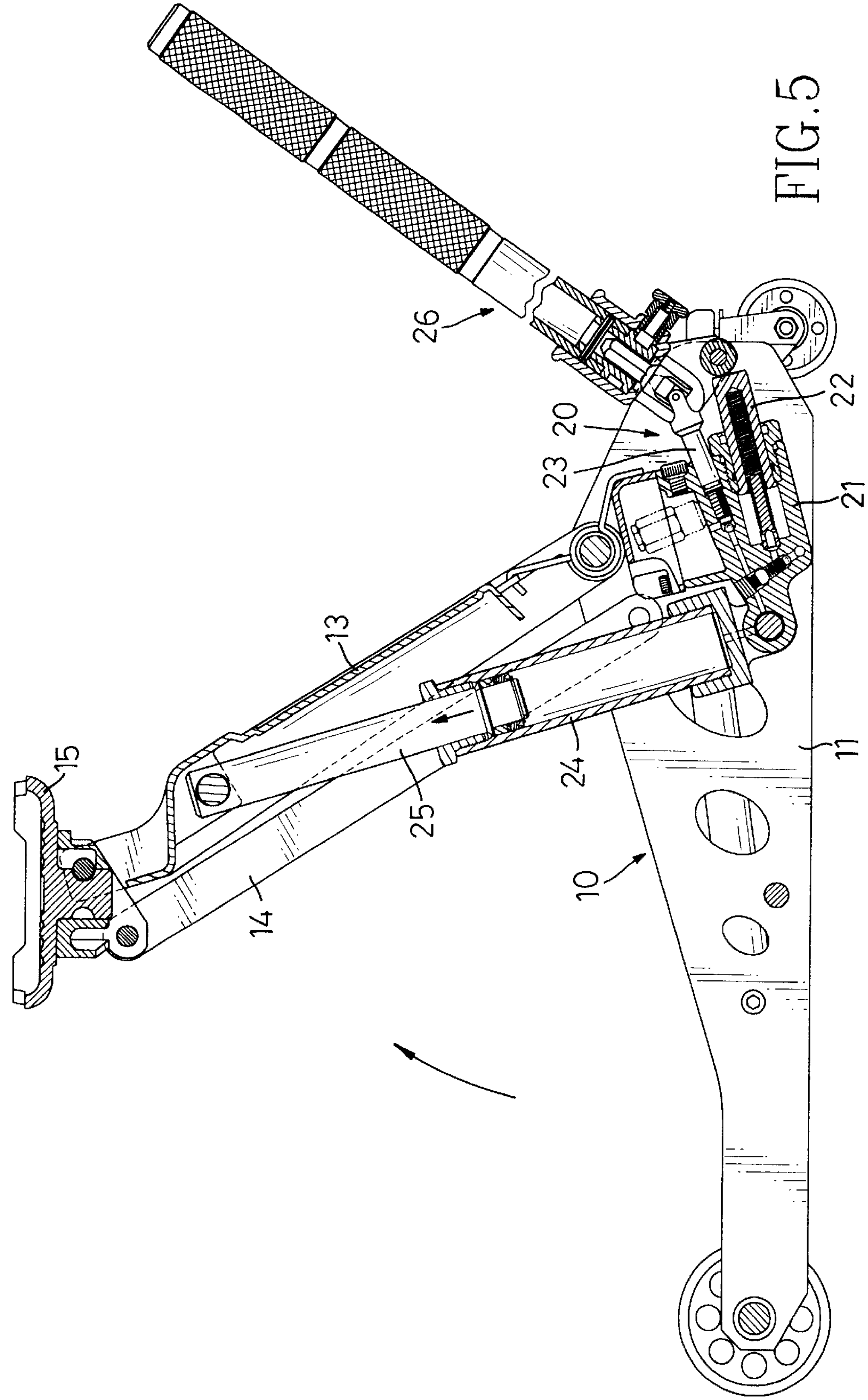
FIG. 5 is a side plan view showing the activation of the second cylinder by the first cylinder.
Figure 6:
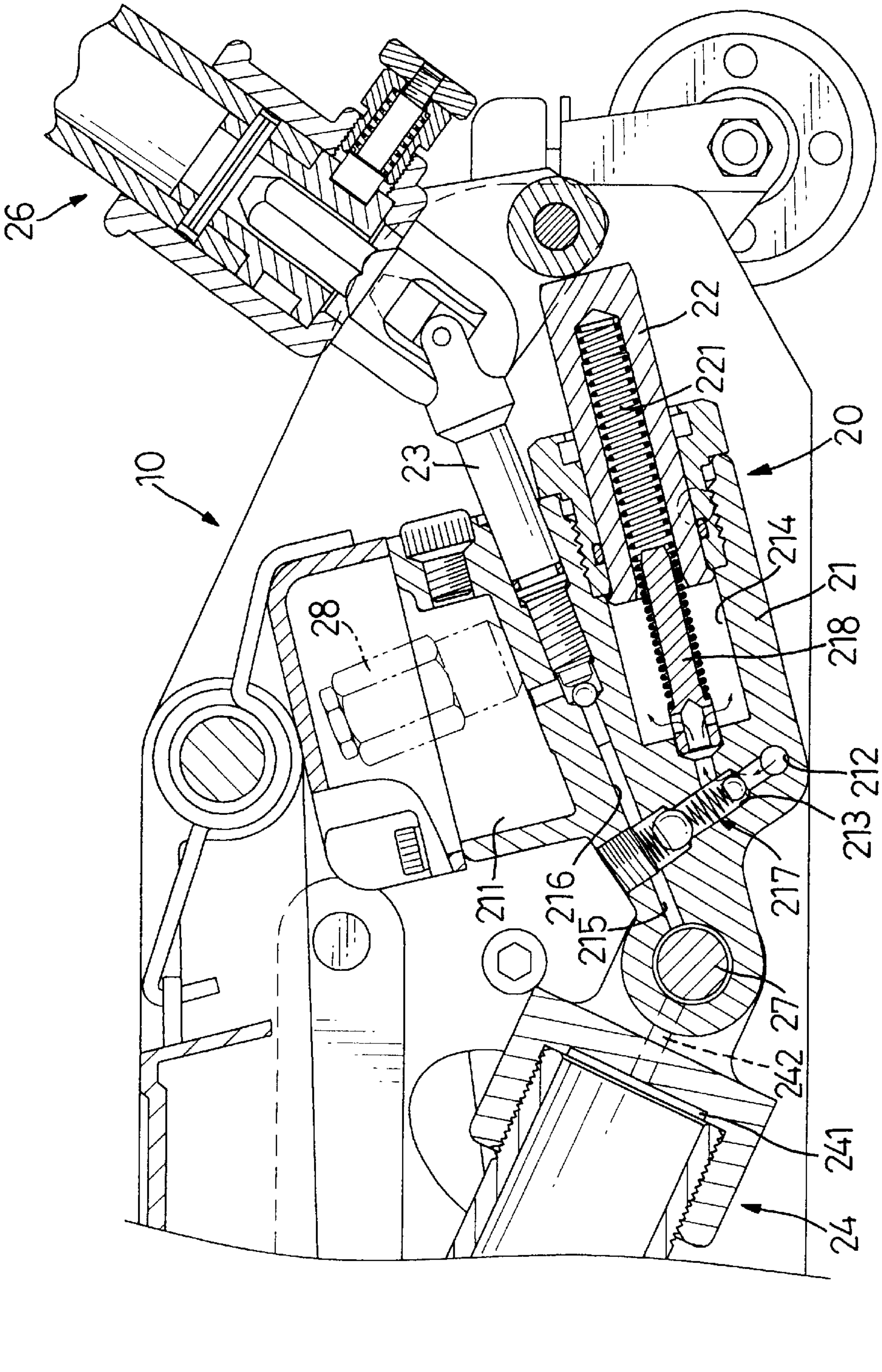
FIG. 6 is a schematic cross sectional view showing the flow path of the hydraulic fluid in the first cylinder.
Figure 7:
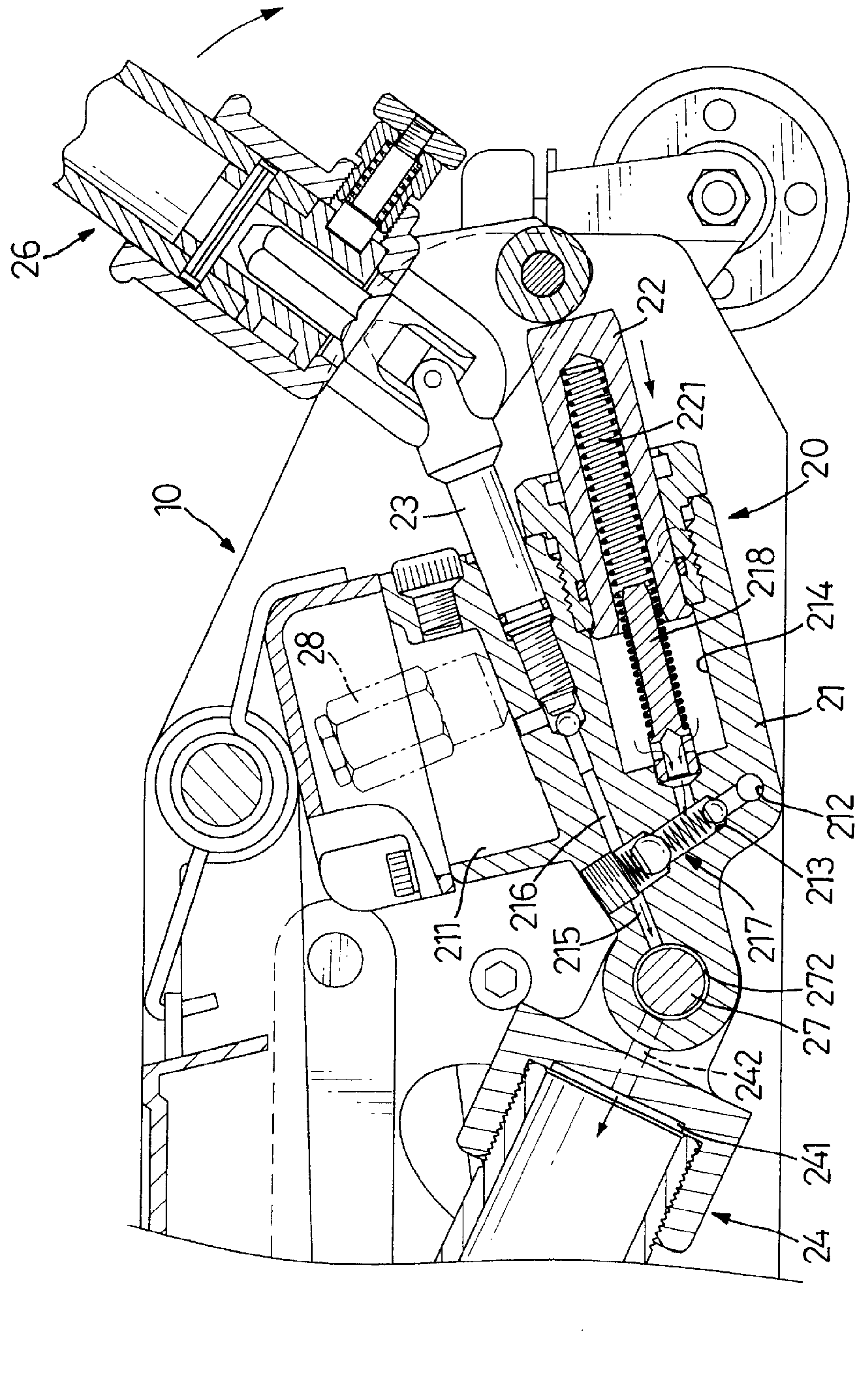
FIG. 7 is a schematic cross sectional view showing the flow path of the hydraulic fluid in the second cylinder in relation to the first cylinder.
Figure 8:
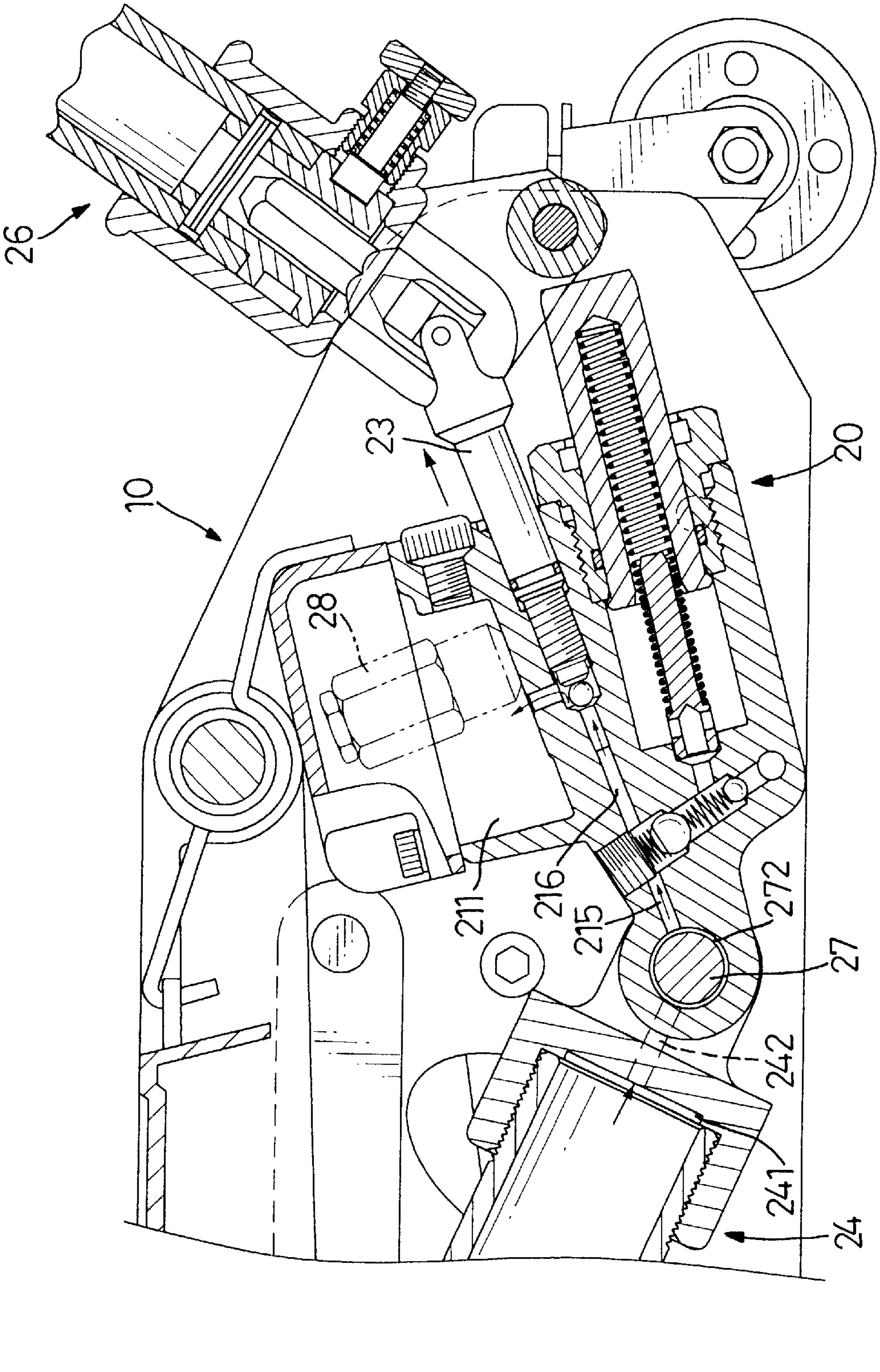
FIG. 8 is a schematic cross sectional view showing the press release mechanism of the hydraulic jack of the present invention.
Figure 9:
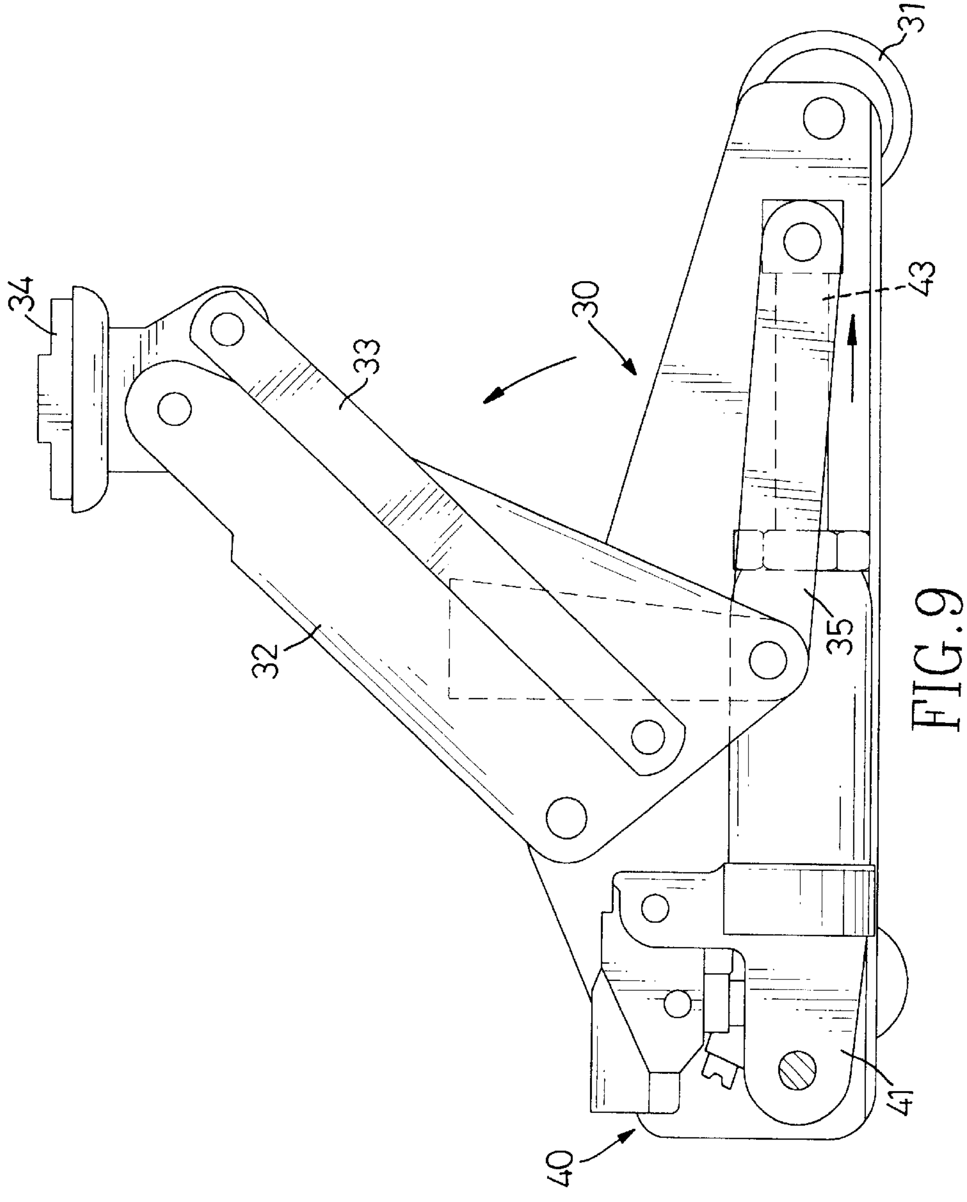
FIG.9 PRIOR ART
FIG. 9 is a side plan view showing a conventional hydraulic jack.

With reference to FIGS. 5, 6 and 7, when the handle (26) starts to pump the first cylinder (20) trying to lift the arm (13) by the assistance of the second piston (25), the release path (216) is blocked by the release rod (23). The hydraulic fluid in the reservoir (211) flows to the drive fluid path (214) from the inlet (212). When the pressure in the drive fluid path (214) starts to build up, everytime the handle (26) moves downward to force the hydraulic fluid in the reservoir (211) to flow into the drive fluid path (214), the unidirectional valve (217) will be forced to temporarily open to allow a portion of the hydraulic fluid to flow into the control path (213), the transmission path (215) and the pivotal shaft (27). As best shown in FIG. 4, when the hydraulic fluid enters the pivotal shaft (27), the hydraulic fluid enters the first annular fluid passage (272), the guide path (271), the second annular fluid passage (273) and the extension path (242) so that the hydraulic fluid is able to be pumped into the piston chamber (241) to drive the second piston (25) to lift the arm (13). Therefore, when there is a load on top of the seat (15), the driving force to the second piston (25) is able to lift the load on the seat (15).

However, when lowering the load is required, the user releases the pressure release rod (23) to open the release path (216) while the unidirectional valve (217) still blocks the communication between the control path (213) and the inlet (212). After the release path (216) is opened, the hydraulic fluid in the piston chamber (241) flows from the extension path (242) and flows through the second annular fluid passage (273), the guide path (271), the first annular fluid passage (272), the transmission path (215) and into the release path (216) so that the hydraulic fluid in high pressure in the piston chamber (241) is able to flow to the reservoir (211). The second piston (25) is able to be retracted due to the weight of the load.

According to the foregoing description, it is noted that the joint between the first cylinder (20) and the second cylinder (24) is pivotal and the pivotal shaft (27) at the joint between the first cylinder (20) and the second cylinder (24) has a guide path (271), a first annular fluid passage (272) to communicate with the transmission path (215) and one end of the guide path (271) and a second annular fluid passage (273) to communicate with the other end of the guide path (271). Therefore, no matter how the pivotal shaft rotates due to the lifting/downward movement of the arm (13), hydraulic fluid is able to flow into/out of the piston chamber (241). Still, because there is only a single joint between the first cylinder (20) and the second cylinder (24), the hydraulic pressure is able to drive the movement of the second cylinder (24) smoothly.

Furthermore, the size of the hydraulic jack is reduced due to the elimination of unnecessary linkage.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the fill extent indicated by the broad general meaning of the terms in which the appended claims are expressed.

What is claimed is:

1. In a hydraulic jack having a first cylinder, a handle pivotally connected to the first cylinder to activate the first cylinder, a second cylinder in communication with the first cylinder and having a piston received in the second cylinder to connect to an arm so as to support a seat on top of the arm, wherein the improvements comprise:

a pivotal shaft is provided at a joint between the first cylinder and the second cylinder so that the first cylinder is pivotally connected to the second cylinder by means of the pivotal shaft, wherein the pivotal shaft has a guide path defined in the pivotal shaft and having two ends, a first annular fluid passage defined to communicate with one end of the guide path and a second annular fluid passage defined to communicate with the other end of the guide path.

2. The hydraulic jack as claimed in claim 1, wherein the first cylinder has a reservoir, an inlet communicating with the reservoir, a control path communicating with the inlet, a drive fluid path communicating with the inlet and the reservoir and a transmission path communicating with the first annular fluid passage.

3. The hydraulic jack as claimed in claim 2 further having a release path selectively communicating with the transmission path and the reservoir.

4. The hydraulic jack as claimed in claim 3 further comprising an extension path provided to communicate the piston chamber to the guide path.

5. The hydraulic jack as claimed in claim 4, wherein a joint between the second cylinder and the arm is pivotal.

6. The hydraulic jack as claimed in claim 3, wherein a joint between the second cylinder and the arm is pivotal.

7. The hydraulic jack as claimed in claim 3, wherein a joint between the second cylinder and the arm is pivotal.

8. The hydraulic jack as claimed in claim 1, wherein a joint between the second cylinder and the arm is pivotal.

9. The hydraulic jack as claimed in claim 1, wherein a joint between the second cylinder and the arm is pivotal.

* * * * *